US012695553B2

(12) United States Patent
Koskinen et al.

(10) Patent No.: US 12,695,553 B2
(45) Date of Patent: Jul. 28, 2026

(54) METHOD FOR CONTROLLING RE-TRANSMISSIONS

(71) Applicant: Nokia Technologies Oy, Espoo (FI)

(72) Inventors: Henri Markus Koskinen, Espoo (FI); Samuli Heikki Turtinen, Oulu (FI); Benoist Pierre Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 353 days.

(21) Appl. No.: 18/549,756

(22) PCT Filed: Feb. 3, 2022

(86) PCT No.: PCT/FI2022/050068
§ 371 (c)(1),
(2) Date: Sep. 8, 2023

(87) PCT Pub. No.: WO2022/189694
PCT Pub. Date: Sep. 15, 2022

(65) Prior Publication Data
US 2024/0163031 A1 May 16, 2024

(30) Foreign Application Priority Data
Mar. 10, 2021 (FI) ..................................... 20215257

(51) Int. Cl.
*H04L 1/1867* (2023.01)
*H04L 69/28* (2022.01)
(52) U.S. Cl.
CPC .............. *H04L 1/188* (2013.01); *H04L 69/28* (2013.01)

(58) Field of Classification Search
CPC ..... H04L 1/188; H04L 1/1819; H04L 1/1854; H04L 69/28; H04W 24/08; H04W 72/56
(Continued)

(56) References Cited

U.S. PATENT DOCUMENTS

2009/0190480 A1    7/2009  Sammour et al.
2013/0194933 A1*   8/2013  Celik .................... H04L 1/1685
                                                      370/242
(Continued)

FOREIGN PATENT DOCUMENTS

CN        106559912 A      4/2017
EP          3723311 A1    10/2020
WO    WO-2022150156 A1 *  7/2022 ............ H04W 24/08

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
(Continued)

*Primary Examiner* — Harun Chowdhury
(74) *Attorney, Agent, or Firm* — Carter, DeLuca & Farrell LLP

(57) ABSTRACT
An apparatus comprising: means for providing an apparatus with a counter in a protocol entity; means for incrementing said counter in response to a timer used by the protocol entity in order to retransmit a poll expiring; and means for providing a Radio Resource Control (RRC) layer of said apparatus or a second apparatus with an indication in response to the counter reaching a predetermined threshold value.

1 Claim, 4 Drawing Sheets

600 — Provide an apparatus with a counter in a protocol entity

602 — Increment said counter in response to a timer used by the protocol entity in order to retransmit a poll expiring 604 — Provide a Radio Resource Control (RRC) functionality of said apparatus or a second apparatus with an indication in response to the counter reaching a predetermined threshold value

(58) Field of Classification Search
USPC ................................. 370/236, 346, 449, 242
See application file for complete search history.

(56) References Cited

U.S. PATENT DOCUMENTS

| | | | |
|---|---|---|---|
| 2016/0302100 A1* | 10/2016 | Kanamarlapudi | .... H04L 1/1854 |
| 2016/0352467 A1 | 12/2016 | Rawat et al. | |
| 2020/0112879 A1* | 4/2020 | Shimoda | ............... H04L 1/1819 |
| 2020/0128416 A1 | 4/2020 | Bergquist et al. | |
| 2020/0145146 A1 | 5/2020 | Decarreau et al. | |

OTHER PUBLICATIONS

"3rd Generation Partnership Project; Technical Specification Group Radio Access Network; Radio Link Control (RLC) protocol specification (Release 16)", 3GPP TS 25.322, V16.0.0, Jul. 2020, pp. 1-90.

"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320, V16.3.0, Dec. 2020, pp. 1-35.

"[E200] On T312 expiry related RLF cause", 3GPP TSG-RAN WG2 #110e, R2-2004722, Agenda Item: 6.12.4, Ericsson, Jun. 1-12, 2020, 12 pages.

Pandey et al., "Efficient Reordering-Reassembly PDCP and RLC Window Management Algorithm in 5G and Beyond", IEEE International Conference on Electronics, Computing and Communication Technologies (CONECCT), Jul. 2-4, 2020, 6 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.3.0, Dec. 2020, pp. 1-1084.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.4.0, Dec. 2020, pp. 1-84.

"3rd Generation Partnership Project; Technical Specification Group Radio Access Network; Evolved Universal Terrestrial Radio Access (E-UTRA); Radio Link Control (RLC) protocol specification (Release 16)", 3GPP TS 36.322, V16.0.0, Jul. 2020, pp. 1-47.

"3rd Generation Partnership Project; Technical Specification Group Radio Access Network; NR; Radio Link Control (RLC) protocol specification (Release 16)", 3GPP TS 38.322, V16.2.0, Dec. 2020, pp. 1-33.

Office Action received for corresponding Finnish U.S. Appl. No. 20/215,257, dated Aug. 26, 2021, 9 pages.

"RLC Re-establishment Triggers", 3GPP TSG-RAN WG2, R2-081122, Agenda Item: 4.3.6, Motorola, Feb. 11-15, 2008, 2 pages.

"5G; NR; Radio Link Control (RLC) protocol specification (3GPP Ts 38.322 version 15.5.0 Release 15)", ETSI TS 138 322, V15.5.0, May 2019, 35 pages.

"3rd Generation Partnership Project; Technical Specification Group Radio Access Network; NG-RAN; F1 application protocol (F1AP) (Release 16)", 3GPP TS 38.473, V16.3.1, Oct. 2020, pp. 1-455.

International Search Report and Written Opinion received for corresponding Patent Cooperation Treaty Application No. PCT/FI2022/050068, dated Apr. 19, 2022, 14 pages.

Office Action received for corresponding Finnish Patent Application No. 20215257, dated May 3, 2022, 9 pages.

Extended European Search Report received for corresponding European Patent Application No. 22766431.5, dated Sep. 6, 2024, 9 pages.

Communication under Rule 71(3) EPC received for corresponding European Patent Application No. 22766431.5, dated Apr. 16, 2025, 7 pages.

* cited by examiner

600 — Provide an apparatus with a counter in a protocol entity

602 — Increment said counter in response to a timer used by the protocol entity in order to retransmit a poll expiring 604 — Provide a Radio Resource Control (RRC) functionality of said apparatus or a second apparatus with an indication in response to the counter reaching a predetermined threshold value

METHOD FOR CONTROLLING RE-TRANSMISSIONS

RELATED APPLICATION

This application was originally filed as PCT Application No. PCT/FI2022/050068, filed on Feb. 3, 2022, which claims priority from FI Application No. 20215257, filed on Mar. 10, 2021, each of which is incorporated herein by reference in its entirety.

TECHNICAL FIELD

The present invention relates to controlling re-transmissions of polling.

BACKGROUND

Radio link control (RLC) is a Radio Link Protocol used as a sublayer of Layer 2 protocol of OSI model on the Air interface in UMTS, LTE and 5G. In terms of the OSI model, RLC is located on top of the 3GPP MAC (Medium Access Control) layer and below the PDCP (Packet Data Convergence Protocol) layer. The functionalities of RLC are almost the same in LTE RLC and in 5G RLC. In both, RLC has 3 different modes of operations: Transparent Mode (TM), Un-Acknowledged Mode (UM) and Acknowledged Mode (AM).

There are various occasions for the Acknowledged Mode which relate to polling for acknowledgement feedback (ACK/NACK) about correctly received and missing data packets and keeping record of the number of retransmissions of a given packet (LTE-RLC PDU or NR-RLC SDU), especially relating to incrementing a retransmission counter RETX_COUNT associated with a packet. Some of these occasions may lead to contradicting interpretations about whether or not the retransmission counter RETX_COUNT associated with a packet is to be incremented when the packet is considered for retransmission due to expiry of the poll-retransmit timer, not due to a NACK received.

This, in turn, may lead to a situation, where different apparatus, such as User Equipment (UEs) may behave differently regarding the RLC PDU retransmissions, depending on the underlying reason and the implementation of the UE. This may cause either unnecessary or too much delayed indications of link failures, for example.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for providing an apparatus with a counter in a protocol entity; means for incrementing said counter in response to a timer used by the protocol entity in order to retransmit a poll expiring; and means for providing a Radio Resource Control (RRC) layer of said apparatus or a second apparatus with an indication in response to the counter reaching a predetermined threshold value.

According to an embodiment, the apparatus comprises means for resetting the counter in response to resetting the timer.

According to an embodiment, said means for incrementing the counter are configured to increment the counter only in response to the expiry of the timer implying a new re-transmission.

According to an embodiment, said means for incrementing the counter are configured to skip the incrementing of the counter in response to the expiry of the timer implying a new value for a Poll send state variable.

According to an embodiment, said indication to the RRC layer is identical to an indication sent upon a retransmission counter of the protocol entity reaching its threshold value.

According to an embodiment, said indication to the RRC layer is distinguishable from an indication sent upon a retransmission counter of the protocol entity reaching its threshold value.

According to an embodiment, said indication is configured to be associated with a report for Minimization of Drive Tests (MDT).

According to an embodiment, said means for incrementing the counter are configured to increment said counter for only a specific type of radio bearer.

According to an embodiment, the protocol entity is a Radio Link Control (RLC) protocol Acknowledged Mode (AM) entity.

According to an embodiment, the apparatus is a user equipment.

According to an embodiment, the apparatus is an access point or a base station of a radio access network.

According to an embodiment, the apparatus is a gNB Distributed Unit (DU) and said second apparatus is a gNB Central Unit (CU).

An apparatus according to a second aspect comprises at least one processor and at least one memory, said at least one memory stored with computer program code thereon, the at least one memory and the computer program code configured to, with the at least one processor, cause the apparatus at least to perform: provide an apparatus with a counter in a protocol entity; increment said counter in response to a timer used by the protocol entity in order to retransmit a poll expiring; and provide a Radio Resource Control (RRC) layer of said apparatus or a second apparatus with an indication in response to the counter reaching a predetermined threshold value.

A method according to a third aspect comprises providing an apparatus with a counter in a protocol entity; incrementing the counter in response to a timer used by the protocol entity in order to retransmit a poll expiring; and providing a Radio Resource Control (RRC) layer of said apparatus or a second apparatus with an indication in response to the counter reaching a predetermined threshold value.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out the operations for controlling re-transmissions of polling. While the following focuses on 5G networks, the embodiments as described further below are by no means limited to be implemented in said networks only, but they are applicable in any network and protocol entities supporting re-transmissions of data packets and polling.

Figure 1:
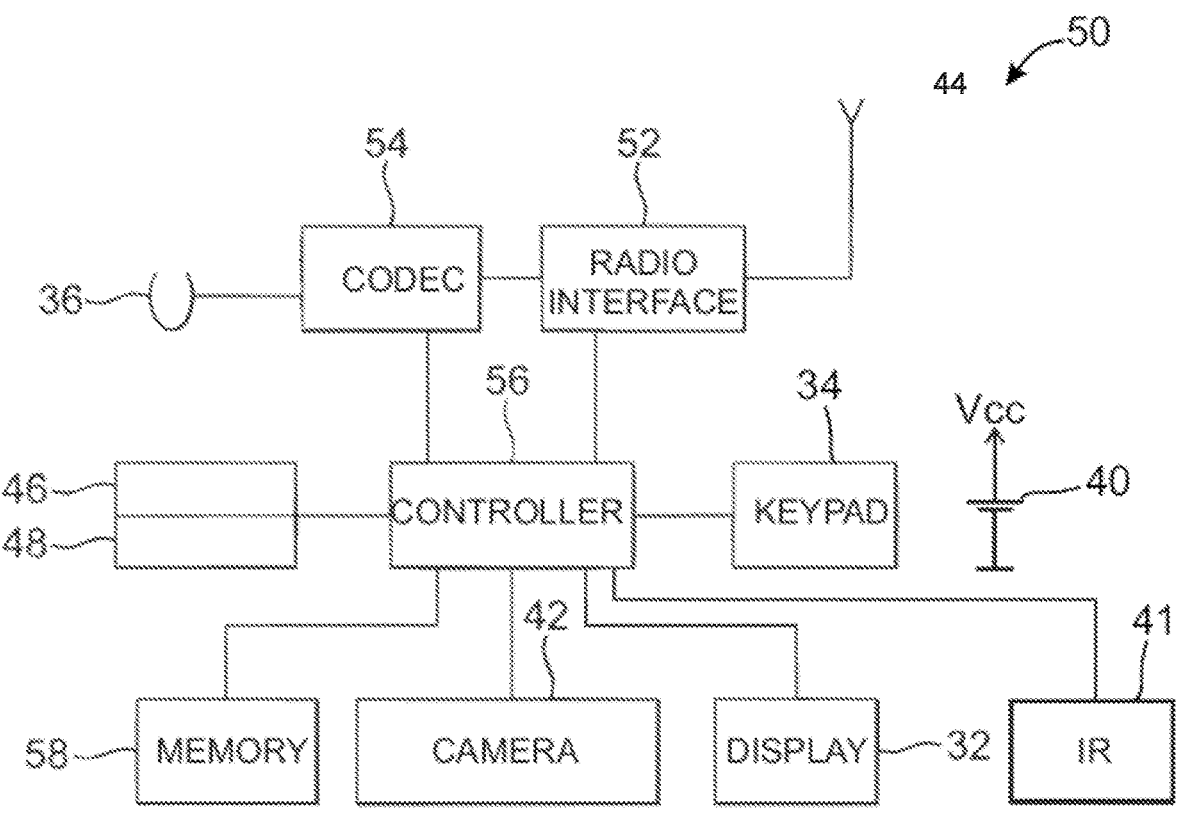
FIG. 1 shows a schematic block diagram of an apparatus for incorporating functionalities for implementing various embodiments.
Figure 2:
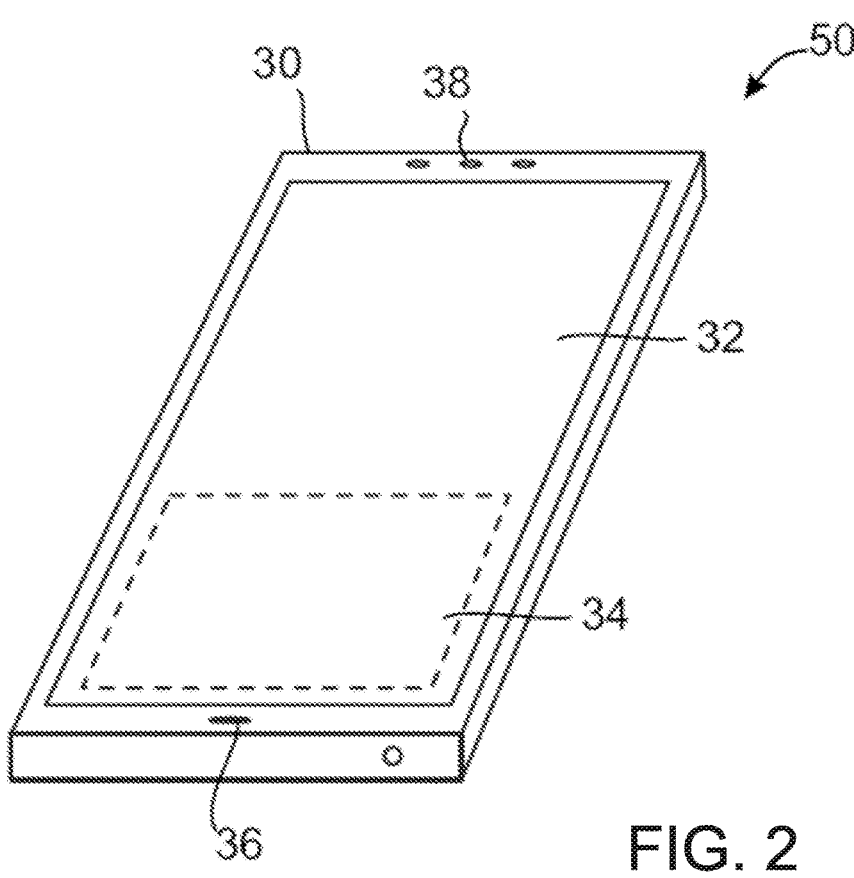
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
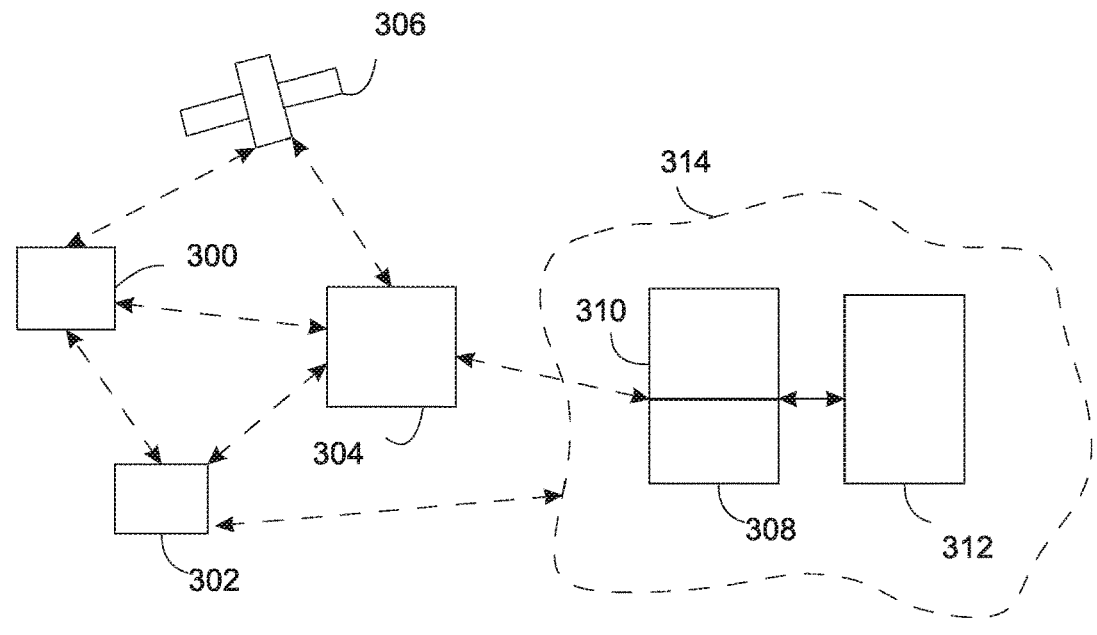
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node (such as Integrated Access and Backhaul (IAB) node), host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR, the User Plane Function (UPF) may be used to separate the control plane and the user plane functions. Therein, the Packet Gateway (PGW) control and user plane functions may be decoupled, whereby the data forwarding component (PGW-U) may be decentralized, while the PGW-related signaling (PGW-C) remains in the core. This allows packet processing and traffic aggregation to be performed closer to the network edge, increasing bandwidth efficiencies while reducing network.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125

MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

Dual Connectivity (DC) is a feature supported in LTE and in 5G NR enabling aggregation of two radio links at the PDCP (Packet Data Convergence Protocol) layer level. For resource aggregation, a UE in RRC CONNECTED state is allocated two radio links from two different network nodes that may be connected via a non-ideal backhaul. The first node, Master Node (MN), serves as mobility and signaling anchor and the second node, Secondary Node (SN), provides additional local radio resources for UE. The two resource sets are called as Master Cell Group (MCG, associated with MN) and Secondary Cell Group (SCG, associated with SN). The MN can be either LTE eNB or NR gNB. The SN can be either LTE eNB or NR gNB. The MN and the SN can be the same node.

Dual Connectivity can improve user throughput and mobility robustness, since the users may be connected simultaneously to MCG and SCG, as well as improve load balancing between MCG and SCG resources.

Dual Connectivity involves three bearer types: MCG bearer, where RLC and MAC protocols are located only at the MN; SCG bearer, where RLC and MAC protocols are located only at the SN; and split bearer, where RLC and MAC protocols are located in both MN and SN. In the split bearer case, the PDCP PDUs may be scheduled to the Radio link control (RLC) layers of both the MN and the SN.

For a more detailed description of Dual Connectivity, a reference is made to 3GPP TS 37.340.

Radio link control (RLC) is a Radio Link Protocol used as a sublayer of Layer 2 protocol of OSI model on the Air interface in UMTS, LTE and 5G. In terms of the OSI model, RLC is located on top of the 3GPP MAC (Medium Access Control) layer and below the PDCP (Packet Data Convergence Protocol) layer.

RLC is specified by 3GPP in TS 36.322 for LTE and TS 38.322 for 5G NR. The functionalities of RLC are almost the same in LTE RLC and in 5G RLC. In both, RLC has 3 different modes of operations: Transparent Mode (TM), Un-Acknowledged Mode (UM) and Acknowledged Mode (AM).

Figure 4:
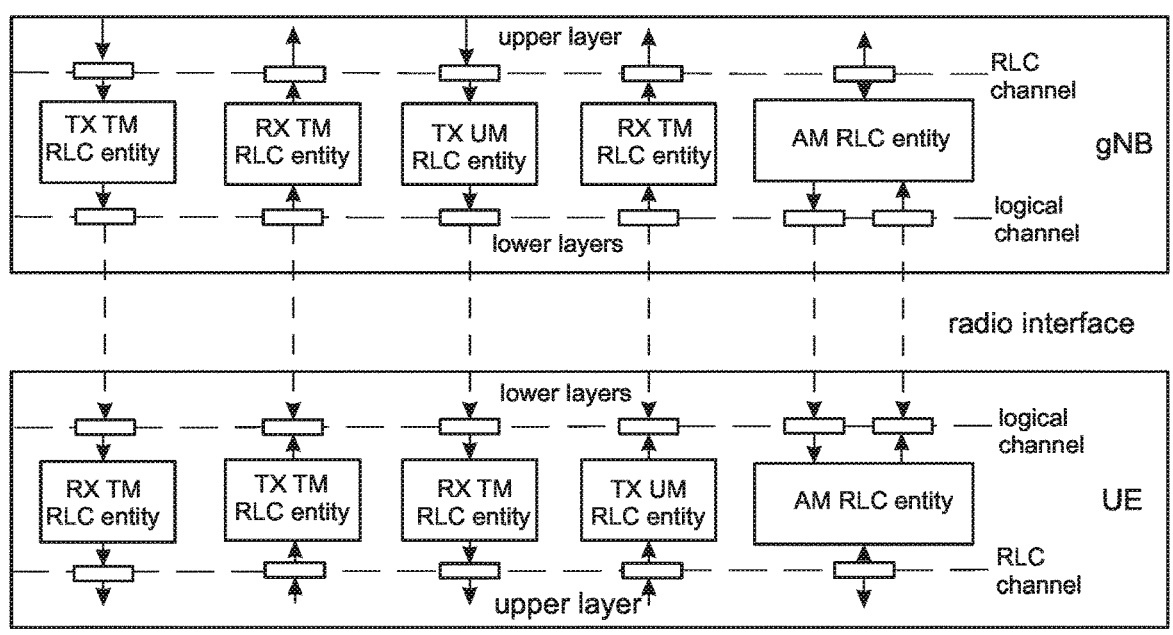
FIG. 4 illustrates the operation of different modes and entities in 5G RLC.

FIG. 4 illustrates the RLC entities in 5G, where TM and UM modes have separate RLC entities for TX and RX functionalities, whereas AM mode has single RLC entity that performs both TX and RX functionalities. The logical channels mentioned above may use certain RLC mode(s) to send and receive RLC data as per their requirements.

In the Un-Acknowledged Mode (UM), the TX functionalities include a segmentation, where larger chunks of RLC SDUs (Service Data Units; corresponding to PDCP PDUs, Protocol Data Units) are split into multiple smaller data chunks into a RLC PDU according to MAC grant. The rest of the RLC PDUs are buffered to be transmitted in the next transmission time interval (TTI). The RLC Header is modified according to the performed segmentation. The RX functionalities receive the segmented data, remove the RLC header and reassemble the segmented data. In UM, only data radio bearers (DBR) are available, and no feedback mechanism for the received RLC PDUs (No ACK/NACK according ARQ) is available.

Figure 5:
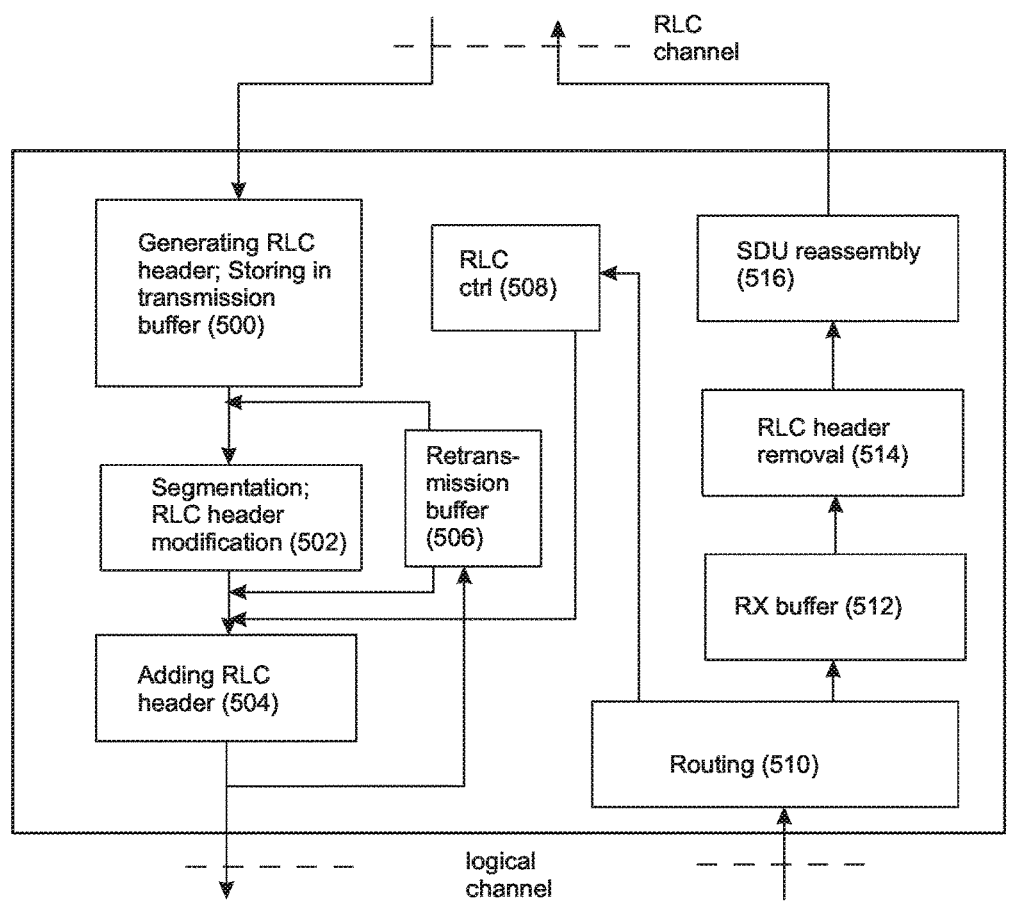
FIG. 5 illustrates the functionalities of an acknowledged mode RLC entity.

The Acknowledged Mode (AM) includes the same functionalities as the UM. FIG. 5 illustrates the functionalities of the RLC AM entity. As the TX functionalities, the RLC header is generated and the RLC PDUs are buffered in the transmission buffer (500). The RLC Header is modified according to the performed segmentation (502), and upon transmission, the modified RLC header is added to the RLC PDU (504). In addition, buffering is carried out at both TX and RX sides and the feedback mechanism is used. For that purpose, the TX side includes a RLC Re-transmission Buffer (506), where a copy of the segmented RLC PDU is stored. The copy may be removed from the Re-transmission buffer upon receiving an ACK from the RX side. If the TX side RLC receives a NACK, or it does not receive any response from the RX side within a predetermined period of time, the buffered RLC PDU is transmitted again. When the RX side of an AM RLC entity receives PDUs, it shall detect whether or not the PDUs have been received in duplication and discard duplicated PDUs. On the other hand, it may detect the loss of PDUs at lower layers and request retransmissions to its peer AM RLC entity. The above operations may be controlled together by the routing (510) and RLC control (512) functionalities. The correctly received PDUs are buffered (512), the headers are removed (514) and RLC SDUs are reassembled (516) from the received PDUs and the RLC SDUs are delivered to upper layer. In AM, both data radio bearers (DBR) and signalling radio bearers SRB1/SRB2/SRB3 are available.

The Transparent Mode (TM) is only used for signalling, and it uses the signalling radio bearer SRB0 for paging and broadcasting System Information (SI). In TM, there is no segmentation or feedback mechanism.

In the LTE and NR RLC specifications TS 36.322 and TS 38.322, there are various occasions for the Acknowledged Mode which relate to polling for ACK/NACK feedback and keeping record of the number of retransmissions of a given packet (LTE-RLC PDU or NR-RLC SDU), especially relating to incrementing the retransmission counter RETX_COUNT associated with a packet.

For example, the NR RLC specification TS 38.322 Rel-16 contains the following.

5.3 ARQ Procedures 5.3.2 Retransmission

. . . .

When an RLC SDU or an RLC SDU segment is considered for retransmission, the transmitting side of the AM RLC entity shall:

if the RLC SDU or RLC SDU segment is considered for retransmission for the first time:

set the RETX_COUNT associated with the RLC SDU to zero.

else, if it (the RLC SDU or the RLC SDU segment that is considered for retransmission) is not pending for retransmission already and the RETX_COUNT associated with the RLC SDU has not been incremented due to another negative acknowledgment in the same STATUS PDU:

increment the RETX_COUNT.

if RETX_COUNT=maxRetxThreshold:

indicate to upper layers that max retransmission has been reached.

5.3.3 Polling 5.3.3.2 Transmission of a AMD PDU

. . . .

Upon submission of an AMD PDU including a poll to lower layer, the transmitting side of an AM RLC entity shall:

set POLL_SN to the highest SN of the AMD PDU among the AMD PDUs submitted to lower layer;

if t-PollRetransmit is not running:

start t-PollRetransmit.

else:

restart t-PollRetransmit.

5.3.3.3 Reception of a STATUS Report

Upon reception of a STATUS report from the receiving RLC AM entity the transmitting side of an AM RLC entity shall:

if the STATUS report comprises a positive or negative acknowledgement for the RLC SDU with sequence number equal to POLL_SN:

if t-PollRetransmit is running:

stop and reset t-PollRetransmit.

5.3.3.4 Expiry of t-PollRetransmit

Upon expiry of t-PollRetransmit, the transmitting side of an AM RLC entity shall:

if both the transmission buffer and the retransmission buffer are empty (excluding transmitted RLC SDU or RLC SDU segment awaiting acknowledgements); or if no new RLC SDU or RLC SDU segment can be transmitted (e.g. due to window stalling):

consider the RLC SDU with the highest SN among the RLC SDUs submitted to lower layer for retransmission; or consider any RLC SDU which has not been positively acknowledged for retransmission.

include a poll in an AMD PDU as described in clause 5.3.3.2.

When RLC indicates to RRC layer that a maximum number of retransmissions (max retransmission, an RRC-preconfigured number), has been reached (just before 5.3.3 above), and when the RLC entity is restricted to use of Secondary cells (SCells), RRC will inform the network side about this by sending FailureInformation. If the RLC entity is not restricted to use SCells, RRC will declare radio link failure of the cell group (master or secondary cell group:

MCG/SCG) to which the RLC entity belongs. This is described more in detail in NR RRC TS 38.331 section 5.3.10.3.

The above scenarios may lead to contradicting interpretations about whether or not the retransmission counter RETX_COUNT associated with a packet is to be incremented when the packet is considered for retransmission due to expiry of the poll-retransmit timer, not due to a NACK received.

For example, the current specifications include a stipulation (e.g. handling of state variable VT(DAT) in TS 25.322 section 11.3.2) that the counter is incremented whenever the packet is considered for retransmission regardless of the reason. Moreover, if the UE has buffered uplink data for which it does not receive ACK/NACK feedback despite a number of polls sent, possibly even stalling its transmission window meaning that no new sequence numbers can be assigned to new data, the UE may consider the radio link failed. These assumptions lead to an interpretation that the retransmission counter RETX_COUNT associated with the packet is to be incremented regardless of the reason for expiry of the poll-retransmit timer.

On the other hand, the reason for a UE not receiving ACK/NACK may be a mere network scheduling decision e.g. due to congestion, not a radio failure. Moreover, the above passage in TS 38.322 section 5.3.2 "and the RETX_COUNT associated with the RLC SDU has not been incremented due to another negative acknowledgment in the same STATUS PDU" suggests that RETX_COUNT should be incremented only based on NACKs received in Status PDUs. These assumptions lead to another interpretation that the retransmission counter RETX_COUNT associated with the packet is to be incremented only when a NACK is received.

Even if the interpretation is that the retransmission counter RETX_COUNT associated with the packet is to be incremented regardless of the reason for expiry of the poll-retransmit timer, there remains the sub-problem that when no ACK/NACK is received (and therefore the poll-retransmit timer expires repeatedly), the above passage in TS 38.322 section 5.3.3.4 "or consider any RLC SDU which has not been positively acknowledged for retransmission" allows a lot of variance in UE behaviour as to how soon a given packet will exceed the maximum number of retransmissions, and consequently how soon the UE RRC will take the appropriate action. While one UE implementation may choose the same packet for retransmission every time the poll-retransmit timer expires, another implementation may select different packets in a round-robin fashion.

Therefore, it would be preferable to have a more accurate control of UE behaviour when the poll-retransmit timer expires repeatedly.

In the following, an enhanced method for unifying the UE behaviour will be described in more detail, in accordance with various embodiments.

Figure 6:
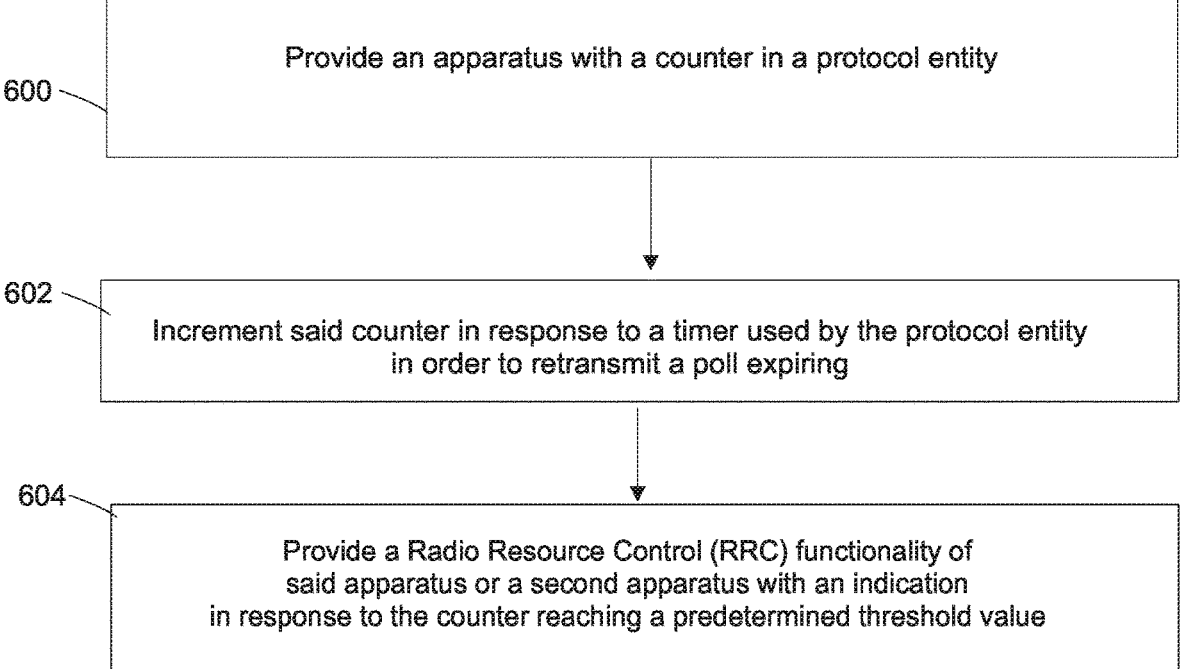
FIG. 6 shows a flow chart for a method for controlling re-transmissions of polling according to an embodiment.

The method is disclosed in flow chart of FIG. 6 as reflecting the operation of a terminal apparatus, for example a user equipment (UE), wherein the method comprises providing (600) an apparatus with a counter in a protocol entity; incrementing (602) the counter in response to a timer used by the protocol entity in order to retransmit a poll expiring; and providing (604) a Radio Resource Control (RRC) layer of said apparatus or a second apparatus with an indication in response to the counter reaching a predetermined threshold value.

According to an embodiment, the protocol entity is a Radio Link Control (RLC) protocol Acknowledged Mode (AM) entity. In the following, various embodiments are described using the RLC protocol and its Acknowledged Mode (AM) entity as implementation examples for illustrating the benefits of the embodiments. It is, however, noted that the various aspects and the embodiments related thereto are not limited to RLC AM entities only, but they may be applicable in other protocol entities according to current or future communication standards.

One example of such protocol entities is the PDCP (Packet Data Convergence Protocol) entity, which may encounter similar problems as described above in certain occasions. Another example is the Backhaul Adaptation Protocol (BAP) entity used in IAB (Integrated Access and Backhaul) concept. The IAB enables to densify networks with multi-band radio nodes with small-sized coverage. The BAP entity in each node maps protocol data units to the appropriate backhaul RLC channel in a manner resembling that of the PDCP entity.

However, using the RLC AM entity as an example, the apparatus, such as the UE, more particularly its transmitting RLC AM entity, is provided with another counter; i.e. in addition to the retransmission counter RETX_COUNT. The counter follows the expirations of a timer, such as the Poll Retransmission timer, in the RLC AM entity and increments its value for each expiration. Upon reaching a predetermined threshold value, the counter value triggers an indication to be sent to the RRC. Thereby, the behaviour of the apparatus, such as the UE, may be unified regarding the poll retransmissions. Moreover, by adjusting the predetermined threshold value the RRC may control the delay during which appropriate actions, e.g. indicating about a link failure, shall be taken.

According to an embodiment, the method comprises resetting the counter in response to resetting the timer. Thus, the resetting of the Poll Retransmission timer initiates the counter back to zero and ensures the unified behaviour of the UE for the next retransmission occasion.

According to an embodiment, the method comprises incrementing the counter only in response to the expiry of the timer implying a new re-transmission. Hence, the counter is only incremented when the following is true:
- if both the transmission buffer and the retransmission buffer are empty (excluding transmitted RLC SDU or RLC SDU segment awaiting acknowledgements); or
- if no new RLC SDU or RLC SDU segment can be transmitted (e.g. due to window stalling).

According to an embodiment, the method comprises skipping the incrementing of the counter in response to the expiry of the timer implying a new value for a Poll send state variable. The POLL_SN variable holds the value of the most recent transmission of a RLC data PDU. If the polling due to the expiry of the poll-retransmit timer implies that a new value shall be assigned for POLL_SN, it is an indication that the transmission buffer is not empty or the transmission window has stalled. In such case, the counter is preferably not incremented even if the Poll Retransmission timer expires.

According to an embodiment, said indication to the RRC layer is identical to an indication sent upon a retransmission counter of the RLC AM entity reaching its threshold value. Thus, the indication to RRC cannot be distinguished by RRC from the current indication of RETX_COUNT reaching its configured threshold value and, accordingly, the resulting actions by RRC are the same as those currently specified.

According to an embodiment, said indication to the RRC layer is distinguishable from an indication sent upon a retransmission counter of the RLC AM entity reaching its threshold value. Thus, the indication can be distinguished by the RRC from the current indication of RETX_COUNT reaching its configured threshold value and the resulting actions may be defined separately. For instance, at reception of said indication from RLC, the UE RRC could only inform the network RRC entity instead of considering a radio link failure to have occurred. This may be performed regardless of whether the RLC entity is restricted to use of SCells.

In single connectivity scenarios, where the UE is not configured with multi-radio dual connectivity (MR-DC), the informing may take place e.g. using one of the spare values in the currently defined failureType information element of FailureInformation uplink RRC message. In MR-DC scenarios, the informing may take place e.g. using one of the spare values in the currently defined failureType of FailureInformation, SCGFailureInformation, SCGFailureInformationNR, or SCGFailureInformationEUTRA uplink RRC message.

The above embodiments have been described from the assumption that the counter is implemented in a terminal apparatus, such as a UE. It is nevertheless noted that the counter and the embodiments related to its implementation may also be applied on network side. For example, 5G specifications provide an option to split the internal structure of a gNB into entities called CU (Central Unit) and one or more DUs (Distributed Unit), which are connected by a F1 interface, as specified in 3GPP 38.473. The split may provide traffic aggregation in terms of one gNB CU serving a plurality of gNB DUs operating as the actual node points for the air interface. The split may be implemented, for example, such that the gNB CU comprises the PDCP and the upper protocol layers and it also hosts the RRC, whereas the one or more DUs comprise the RLC and the lower layers.

Thus, the RLC-to-RRC indication, according to the embodiment where said indication to the RRC is distinguishable from an indication sent upon a retransmission counter of the RLC AM entity reaching its threshold value, may be specified as part of the F1AP protocol applied between gNB Distributed Unit (hosting RLC) and gNB Central Unit Control Plane (hosting RRC). This is one example of what is referred to as "the second apparatus" in the method of the flow chart in FIG. 6. In MR-DC scenarios, the informing may also take place between MN and SN e.g. using a spare value in the currently defined failureType of scgFailureInfo in CG-ConfigInfo.

According to an embodiment, said indication may be associated with a report for Minimization of Drive Tests (MDT). For example, the indication of the failure related to consecutive expiry of the poll-retransmit timer may be included or reflected in Radio Link Failure report (rlfReport or equivalent) as part of the Radio measurement collection for Minimization of Drive Tests (MDT), as defined in 3GPP TS 37.320.

According to an embodiment, the method comprises incrementing said counter for only a specific type of radio bearer. Thus, the configuration may be limited to a particular type of radio bearer, i.e. data radio bearers DRB or any type of signalling radio bearers SRB0/SRB1/SRB2/SRB3.

According to an embodiment, which may be implemented as a combination of one or more other embodiments or as an independent method, the method comprises considering a partial or full portion of an RLC packet (such as an RLC SDU or PDU) for retransmission; determining whether the considering is caused by expiry of a poll retransmission timer; and incrementing a counter associated with a number of transmissions of the RLC packet depending on the determination.

According to an embodiment, the considering for retransmission may comprise including the RLC packet in a queue of packets to be retransmitted if not included in the queue already.

According to an embodiment, the determining whether the considering is caused by the expiry of a poll retransmission timer may comprise determining whether the considering is a part of actions taken in response to expiry of a poll retransmission timer.

According to an embodiment, the incrementing of the counter associated with a number of transmissions of the RLC packet depending on the determination may comprise incrementing the counter only if the considering the RLC packet for retransmission is not caused by expiry of a poll retransmission timer.

The method and the embodiments related thereto may be implemented in an apparatus implementing a user equipment (UE). The apparatus may comprise at least one processor and at least one memory, said at least one memory stored with computer program code thereon, the at least one memory and the computer program code configured to, with the at least one processor, cause the apparatus at least to perform: provide an apparatus with a counter in a protocol entity; increment said counter in response to a timer used by the protocol entity in order to retransmit a poll expiring; and provide a Radio Resource Control (RRC) layer of said apparatus or a second apparatus with an indication in response to the counter reaching a predetermined threshold value.

Such an apparatus may likewise comprise: means for providing an apparatus with a counter in a protocol entity; means for incrementing said counter in response to a poll retransmission timer, used by the protocol entity in order to retransmit a poll, expiring; and means for providing a Radio Resource Control (RRC) layer of said apparatus or a second apparatus with an indication in response to the counter reaching a predetermined threshold value.

The method and the embodiments related thereto may also be implemented in an apparatus implementing an access point or a base station of a radio access network, such as an eNB or a gNB. An apparatus, such as a gNB, according to an aspect comprises means for providing an apparatus with a counter in a protocol entity; means for incrementing said counter in response to a poll retransmission timer, used by the protocol entity in order to retransmit a poll, expiring; and means for providing a Radio Resource Control (RRC) layer of said apparatus or a second apparatus with an indication in response to the counter reaching a predetermined threshold value.

An apparatus, such as an access point or a base station of a radio access network, e.g. an eNB or a gNB, according to a further aspect comprises at least one processor and at least one memory, said at least one memory stored with computer program code thereon, the at least one memory and the computer program code configured to, with the at least one processor, cause the apparatus at least to perform: provide an apparatus with a counter in a protocol entity; increment said counter in response to a timer used by the protocol entity in order to retransmit a poll expiring; and provide a Radio Resource Control (RRC) layer of said apparatus or a second apparatus with an indication in response to the counter reaching a predetermined threshold value.

According to an embodiment, any of the above apparatus is configured to reset the counter in response to resetting the timer.

According to an embodiment, any of the above apparatus is configured to increment the counter only in response to the expiry of the timer implying a new re-transmission.

According to an embodiment, any of the above apparatus is configured to skip the incrementing of the counter in response to the expiry of the timer implying a new value for a Poll send state variable.

According to an embodiment, in any of the above apparatus said indication to the RRC layer is identical to an indication sent upon a retransmission counter of the protocol entity reaching its threshold value.

According to an embodiment, in any of the above apparatus said indication to the RRC layer is distinguishable from an indication sent upon a retransmission counter of the protocol entity reaching its threshold value.

According to an embodiment, in any of the above apparatus said indication is configured to be associated with a report for Minimization of Drive Tests (MDT).

According to an embodiment, any of the above apparatus is configured to increment said counter for only a specific type of radio bearer.

According to an embodiment, in any of the above apparatus the protocol entity is a Radio Link Control (RLC) protocol Acknowledged Mode (AM) entity.

Such apparatuses may comprise e.g. the functional units disclosed in any of the FIGS. 1-5 for implementing the embodiments.

A further aspect relates to a computer program product, stored on a non-transitory memory medium, comprising computer program code, which when executed by at least one processor, causes an apparatus at least to perform: provide an apparatus with a counter in a protocol entity; increment said counter in response to a timer used by the protocol entity in order to retransmit a poll, expiring; and provide a Radio Resource Control (RRC) layer of said apparatus or a second apparatus with an indication in response to the counter reaching a predetermined threshold value.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:

at least one processor; and at least one memory, said at least one memory stored with computer program code thereon, the at least one memory and the computer program code configured to, with the at least one processor, cause the apparatus at least to perform:

providing a counter in a protocol entity;

using a timer, by the protocol entity, in order to retransmit a poll;

incrementing said counter only in response to expiry of the timer implying a new transmission by (i) a transmission buffer and a retransmission buffer both being empty aside from transmitted Radio Link Control (RLC) service data unit (SDU) or RLC SDU segment awaiting acknowledgments, or (ii) no new RLC SDU or RLC SDU segment being able to be transmitted due to transmission window stalling;

skipping incrementing of the counter in response to the expiry of the timer implying a new value for a Poll send state variable by (i) the transmission buffer not being empty, or (ii) transmission window stalling;

providing a Radio Resource Control (RRC) layer of said apparatus or a second apparatus with an indication in response to the counter reaching a predetermined threshold value; and resetting the counter in response to resetting the timer, wherein the protocol entity maintains a retransmission counter associated with a packet, and wherein the counter is separate from the retransmission counter, wherein said indication to the RRC layer is distinguishable from an indication sent upon the retransmission counter of the protocol entity reaching its threshold value, wherein said indication is configured to be associated with a report for Minimization of Drive Tests (MDT), wherein the apparatus is configured to increment said counter only for signaling radio bearer SRB0 and not for any of signaling radio bearers SRB1, SRB2, and SRB3, wherein the protocol entity is a Radio Link Control (RLC) protocol Acknowledged Mode (AM) entity, and wherein, when the apparatus is a gNB Distributed Unit (DU) and the second apparatus is a gNB Central Unit (CU), the indication is provided from the gNB Distributed Unit (DU) to the gNB Central Unit (CU) using an F1 Application Protocol message.

* * * * *